United States Patent [19]

Stenzel et al.

[11] Patent Number: 4,591,707

[45] Date of Patent: May 27, 1986

[54] PRINTED SECURITY WITH HALLMARKS

[75] Inventors: Gerhard Stenzel, Munich; Wittich Kaule, Gauting, both of Fed. Rep. of Germany

[73] Assignee: Gao Gessellschaft fur Automation und Organisation mbH, Munich, Fed. Rep. of Germany

[21] Appl. No.: 644,641

[22] Filed: Aug. 23, 1984

Related U.S. Application Data

[63] Continuation of Ser. No. 348,552, Feb. 12, 1982, abandoned, which is a continuation-in-part of Ser. No. 82,255, Oct. 5, 1979, Pat. No. 4,289,978.

[30] Foreign Application Priority Data

Oct. 18, 1978 [DE] Fed. Rep. of Germany ....... 2845401

[51] Int. Cl.[4] .............................................. G06K 19/06

[52] U.S. Cl. .................................... 235/493; 235/448; 235/451

[58] Field of Search ........................ 235/448, 451, 493

[56] References Cited

U.S. PATENT DOCUMENTS

| | | |
|---|---|---|
| 3,829,373 | 8/1974 | Kuehnle . |
| 4,000,458 | 12/1976 | Lorimer et al. . |
| 4,114,032 | 9/1978 | Brosow et al. . |
| 4,146,792 | 3/1979 | Stenzel et al. . |
| 4,157,784 | 6/1979 | Grottrup et al. . |
| 4,181,251 | 1/1980 | Becker . |
| 4,455,039 | 6/1984 | Weitzen ......................... 235/375 X |

FOREIGN PATENT DOCUMENTS

| | | |
|---|---|---|
| 2001944 | 7/1971 | Fed. Rep. of Germany . |
| 992320 | 5/1965 | United Kingdom . |
| 1146289 | 3/1969 | United Kingdom . |
| 1353244 | 5/1974 | United Kingdom . |
| 1365876 | 9/1974 | United Kingdom . |
| 1376505 | 12/1974 | United Kingdom . |

*Primary Examiner*—Harold I. Pitts

*Attorney, Agent, or Firm*—Neuman, Williams, Anderson & Olson

[57] ABSTRACT

This invention relates to a security paper with a hallmark in the form of a coating applied by vacuum deposition techniques to the surface of a paper substrate. The coating is very thin and almost invisible to the naked eye even as a metal layer, although permitting accurate automatic or machine examination for verification purposes. the absorption of the hallmarks in a certain range of the wavelength of the spectrum, the exiting spcetrum of luminescence, the photoconductivity and/or the electrical conductivity of the hallmarks are characteristics used during the automatic examination of the authenticity of the security paper.

33 Claims, 4 Drawing Figures

PRINTED SECURITY WITH HALLMARKS

This application is a continuation of our application, Ser. No. 348,552, filed Feb. 12, 1982, now abandoned which is a continuation-in-part of our application, Ser. No. 082,255, filed Oct. 5, 1979, now U.S. Pat. No. 4,289,978.

FIELD OF THE INVENTION

This invention relates to security papers with hallmarks as well as to a method for inspecting such a security.

DESCRIPTION OF THE PRIOR ART

In order to obviate forgeries and fakes it has long been known to design or provide securities requiring protection so that imitation or alteration by unathorized persons is rendered impossible, or hampered to such an extent that the effort required for such forgery or alteration substantially exceeds the profit to be gained.

Those safety techniques have proved themselves in the past which necessitate, on the one hand, a very high expenditure for the apparatus and labor invested, which forgers cannot raise, thus making the production of small numbers of forgeries uneconomical. Safety techniques also include features which cannot be inspected definitively as to their authenticity by anyone without additional equipment and without a great amount of expertise. If a plurality of hallmarks is employed simultaneously, such hallmarks originating preferably from different sectors of technology and being added to the security during various stages of the production process, the safeguarding effect can be enhanced substantially. As during circulation securities are subject to considerable strain and wear, one requirement must be that the hallmarks to be used can be detected well in unchanged form even in case of highly worn securities. Providing the securities with true watermarks as well as with safety threads which can only be supplied by means of expensive apparatus during the manufacturing process has proved successful in particular in the case of bank notes. Likewise, valuable hallmarks are also extremely fine steel gravure printing patterns which are very labor-intensive.

A strong trend to automation has also made itself felt for some time now in general payment transactions. It is thus necessary to provide in addition to the cited, visually inspectable hallmarks others which can be recognized as being authentic by automatic inspection instruments with the same or even greater safety.

Securities with automatically inspectable hallmarks have been known in patent literature for some time. German Offenlegungsschrift No. 23 28 880 describes a safety paper wherein fibers which can be magnetized in a preferable direction are admixed with the pup. These fibers have a core of plastic, carbon or the like, the surface of which is coated with a commercial magnetizable material. The coating is preferably formed galvanically, but can also be effected by vacuum evaporation or by other deposition methods.

To be able to detect the dark fibers during inspection, however, it is necessary to admix them in such a concentration that they impart to the paper a dark gray appearance similar to packing paper. Moreover, the automatic checking instrument in accordance with German Offenlegungsschrift No. 24 17 564 which is proposed to inspect the resultant magnetic field is disproportionately expensive.

A safety thread for securities with a novel, automatically inspectable hallmark is proposed in German Auslegeschrift No. 22 12 350. The thread is designed as a hollow filament of transparent plastic, the internal cavity being filled with liquid crystals and fused together. The filling is selected such that a color change can be registered at a specific temperature which can be chosen between the limits of $-50°$ C. and $+250°$ C.

A safety thread according to the latter invention, however, can hardly be expected to withstand the mechanical strain to which a bank note, for instance, is subject during circulation. Imprints by means of a steel gravure printing procedure would rupture the hollow filaments and allow the hallmark substance to escape. If the bank notes were folded, the same consequences would have to be anticipated.

In addition to the above-cited features, there is a plurality of other features with magnetic, electrical or this context as being representative of such other features. The fluorescent substances are either admixed to the pulp during paper production or are incorporated into the still moist, semi-finished paper or printed onto the finished paper. Reference is made only by way of example to German Pat. No. 23 20 731 from which it is known to apply to one or more sites on a security, fluorescent substances of a specific concentration which have a characteristic emission spectrum, preferably line duplets. The authenticity of the security can be determined with high reliability by quantitively measuring the fluorescent emission spectrum. Since the hallmark substances are printed onto the finished paper afterwards, the protection which can be achieved is less than that achieved by the application process and the hallmark substances themselves must be safeguarded in general by rigorously restricting their availability.

U.S. Pat. No. 4,181,251 discloses a hallmark consisting, for instance, of a metal film vacuum-evaporated onto a foil with a smooth surface. A semiconductor or photoconductive layer is then vacuum-evaporated onto the metal film. The surface is sealed by a thin dielectric foil. An electrical conductivity pattern is introduced into the middle layer which can be rendered visible in the form of a charge image on the surface of the dielectric foil. The image can be read for authentication purposes and, after reading can be cancelled or erased. The conductivity pattern in the middle layer, however, is permanent. This known hallmark serves to protect specific bits of information or serves to identify the authenticity of recording carriers such as identification cards, check cards and the like which all have a multi-layer structure. Even if the conductivity pattern is per se invisible, it should be noted that the information bearing semiconductor layer is not at all transparent but has the appearance of a grey or black area. Also, this hallmark system requires a plurality of layers to provide the desired authentication for the security on which disposed.

Reading of the information as proposed in the above U.S. patent has as a precondition a thickness of the layer surface in the order of microns. Therefore, these hallmarks are unsuitable for safeguarding a paper security such as a bank note or stock certificate.

Since a forger does not as a rule possess paper-manufacturing apparatus, the difficulty of introducing hallmark substances into the paper during its production provides considerable protection from forgery. For authentication inspection purposes, it is very desirable to provide a possibility for differentiating between those hall mark substances which are merely printed onto a substrate and those introduced directly into the paper, owing to the different degrees of difficulty in imitating them. It is generally impossible in practice to make such a differentiation in the case of optically effective hallmarks, since the binders used for printing exhibit an absorption behavoir similar to that of the paper. Although the hallmark substances can also be printed invisibly, i.e., without adding colored printing pigments, the person skilled in the art has knowledge of methods for subsequently rendering the printing varnish visible again.

Securities which have been equipped with hallmarks by embedding them into the paper mass or by printing them on the paper offer inadequate protection from special methods of forgery known to the person skilled in the art. If a bank note is torn in half, for example, hallmarks embedded in the paper mass will be found in both halves of the bank note. If the printing ink of the bank notes is dissolved by solvents and is transferred in part to foreign paper, hallmarks which were in the printing ink will also be transferred at the same time in part.

Also, it is known from German Pat. No. 25 30 905 to protect the printed image of a security by a homogeneous layer which has specific remission or fluorescent properties which differ from those of the security or the printing ink. Damage to this protective layer by erasing or other manipulation can be visually detected by means of suitable illumination. However, to obtain good ahesion of the surface of the security to be protected, the protective layer must necessarily have a binder which falsifies the measurement of certain physical properties such as the remission and transmission of the printed image in certain wavelength ranges.

In light of these drawbacks of the above known hallmarks of the prior art, it is desirable for the production of securities to have new hallmarks with other properties available. A commensurate expenditure for the authenticity protection can then be made depending on the intended purpose and value of the respective document.

SUMMARY OF THE INVENTION

A main object of the invention is the safeguarding of paper carriers with novel hallmarks. These hallmarks should have properties which are specific to vacuum deposition techniques and which cannot be obtained by means of other deposition techniques or forgery techniques. They should be applicable to paper substrates and be reliably machine-inspectable in automats and thus guarantee utmost protection from forgery, imitation or counterfeiting.

This object is accomplished in accordance with this invention by employing hallmarks in the form of a coating on the rough external surface of the paper substrate. The coating is free of binders and visually provides the same surface structure as the paper substrate. The hallmarks are applied by vacuum deposition techniques such as evaporation or cathode sputtering. The paper substrate can be printed before the hallmark is applied, or after hallmark application.

If the paper is printed after the hallmark has been applied, the printing has to be accomplished according to this invention in such a way that areas of the hallmark remain in which the specific properties can be measured free from any other influences or conditions, as may be created for instance by the printing ink.

This can be achieved by the use of suitable printing inks which are selected in such a way that the characteristic of the hallmark which is located underneath the printing ink can be measured without being influenced by the printing ink. As an alternative, the ink pattern is printed on the security in such manner that the hallmark is not completely covered, and uncovered, unprinted hallmark areas remain which allow an exact measurement of the characteristic hallmark feature free of any other parameters. Since security papers are normally designed or printed in such a way that the printed pattern or image is discontinuous and includes unprinted areas it should not be difficult to fulfill the conditions mentioned above. If the security paper is covered by a transparent, protective cover layer this cover layer should allow an exact measurement of the characteristic property or properties being measured for authentication purposes. If optical characteristics of the hallmarks have to be measured, the protective cover sheet must be homogeneously transparent in the portion of the spectrum in which the measurement of the characteristic properties is made.

The hallmark of this invention can be applied as a coating either covering the security paper completely or only part of the security surface. It is particularly advantageous if the coating is applied in the form of a pattern, such as stripes, figures, etc. In this way the advantage of a well-defined margin is combined with the advantage of using less hallmark-forming material. One other advantage of the pattern-like coating is the possibility of achieving a well-defined paper-security standard reading from the noncoated areas for comparison with the adjacent coated areas.

Neither binders nor pigments are used to deposit or apply the hallmark materials which are known per se and which constitute the coating. The result is nonetheless a surface coating on the paper which has good adhesive properties and, if desired, can be invisible. The binderless hallmark material of the invention thus eliminates any action or effect of the commercially employed binders which adulterates or invalidates the physical properties such as fluorescence or ultraviolet light absorption.

Further advantages of the invention will be noted from the following description when read in the light of the drawing and appended claims.

BRIEF DESCRIPTION OF THE PREFERRED EMBODIMENTS

A preferred method for depositing the hallmark surface coating of this invention is cathode sputtering. For this purpose, the printed or unprinted security paper is put into a vacuum chamber where the air is evacuated and the hallmark substance is then applied. Suitable facilities for sputtering coatings onto paper are known and described in German Offenlegungsschrift No. 24 00 510. Facilities of this kind are available on the market in single-piece production.

The hallmark substance is advantageously applied to the security only in strips. This saves material on the one hand and on the other hand a standard of comparison is obtained for the inspecting procedure as above noted.

The characteristic, thin and well-adhering coating of the paper fibers achieved by means of cathode sputtering is very resistant to wear, consists exclusively of the hallmark substance, and includes no additives. Such prepared papers thus exhibit a number of advantages which cannot be obtained with other, hitherto employed deposition methods of the prior art. This will be explained in more detail in the following examples which are provided for illustrative purposes and not limitation. It is, of course, possible for the person skilled in the art to perceive other applications in which the aforementioned advantages of sputtered hallmark layers of this invention can be utilized.

Figure 1:
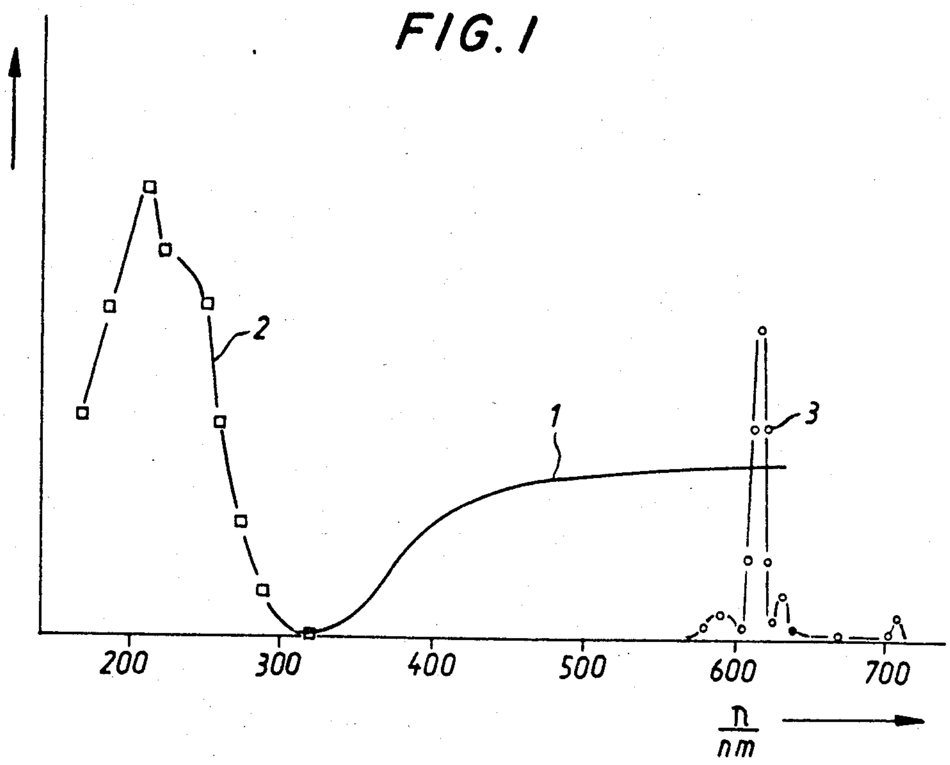
FIG. 1 is a graphical representation of optical characteristics of a security paper and hallmark substance yttrium oxide which may be employed in the subject invention.

A simple and effective authenticity inspection is possible using a hallmark which can be excited to fluoresce in a wavelength range in which the transmission of the security paper and the analogous behavior of the binders and pigments is normally reduced to zero. When excited in this wavelength range, the fluorescent emission of hitherto known types of application has not been achieved in an intensity adequate for practical inspection without a substantially greater use of material. The reason is the optical behavior of the paper employed whose transmission is illustrated by curve 1 in FIG. 1. The transmission of the paper drops to almost zero in the wavelength range from 300–450 nm. Hence, the fluorescent substances introduced into the pulp cannot be adequately excited by light with a wavelength less than 350 nm. Owing to the similar absorption behavior of binders and pigments, the printed layers of the fluorescent substances behave comparably. Yttrium oxide ($Y_2O_3$) doped with europium is used preferably as the hallmark substance for this application. This material has special optical properties; it fluoresces in an extremely narrow band at approximately 600 nm when the fundamental lattice is excited with light in the wavelength range less than 300 nm (literature: N. Riehl, "Introduction to Luminescence," Karl Thiemig Verlag, Munich, 1970, page 127). The excitation spectrum is illustrated as curve 2 in FIG. 1, the emission spectrum as curve 3. These curves represent literature values. As tests have shown, the corresponding values of the sputtered layers can deviate with respect to their magnitude, but qualitatively still exhibit the same progress.

Should the forger succeed at all in identifying the fluorescent behavior of the hallmark substance, he will then attempt to produce the excitation spectrum in the wavelength range in question, i.e., with light less than 300 nm, with a fluorescent emission at 600 nm. He could succeed, depending on the circumstances, by making a considerable expenditure of material, for example. Since this coating must be deposited using conventional methods, i.e., binders and pigments must be applied together with the hallmark substance, the absorption behavior of the paper or of the binder and pigments will determine the intensity of the fluorescent emission. The authenticity of the security can then be proved reliably when measurements are made at two different irradiating light wavelengths, both of which have a shorter wavelength than 300 nm. The fluorescent emission, however, of the security upon which a binder-free coating has been sputtered is almost entirely independent of the wavelength used for excitation during both measurements. If the security has been forged, the intensity of the fluorescent emission will be clearly lower when excited with the shorter wavelength due to the higher absorption of the binders and pigments.

Yet another advantage is that the sputtered layer cannot be dissolved in the organic agents with which a color coating can be applied to a forgery. Hence, if such an attempted forgery is undertaken, the hallmark substance will subsequently not exist on the fake, thereby making such a fake readily identifiable even in case of automatic or machine inspection.

Even if the paper is torn into two halves, only one half would have the hallmarks in the case of the inventive coating. Upon inspection, one of the two halves would become conspicuous in any case as being the fake.

Figure 2:
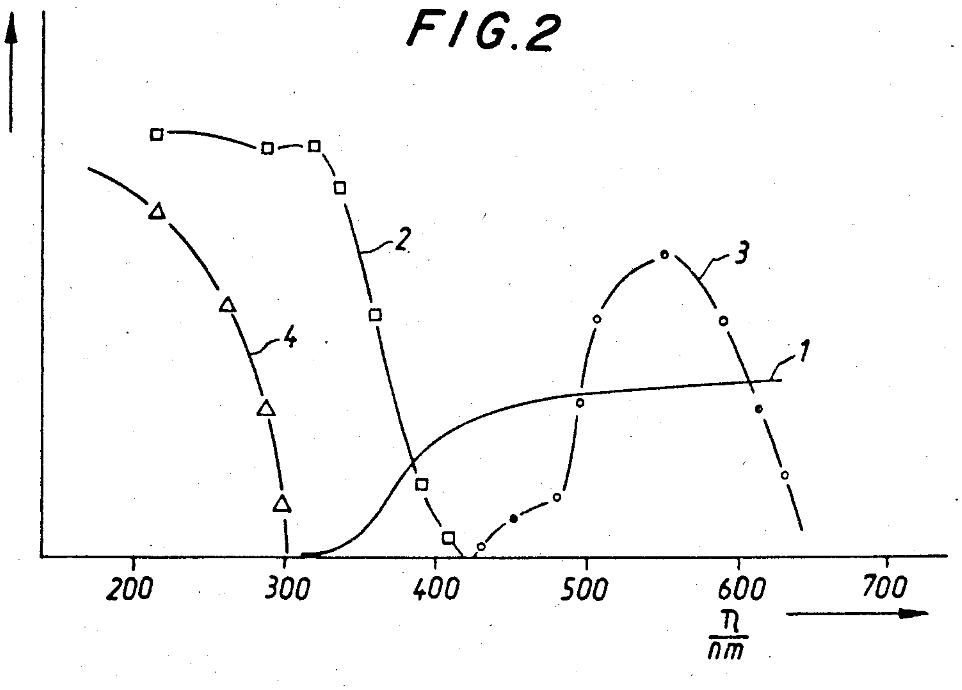
FIG. 2 is similar to FIG. 1 and shows optical characteristics of a security paper and a second hallmark substance, zinc sulfide doped with copper.

Another equally effective inspection method results when a hallmark substance is used whose fluorescent emission can be excited by irradiation with wavelengths less than 400 nm. The fluorescent emission can exhibit a relatively broad band. Curve 1 in FIG. 2 again depicts the transmission of the security itself, curve 2 illustrates the excitation spectrum and curve 3 the emission spectrum (literature values).

One hallmark substance which exhibits such behavior is zinc sulfide doped with copper, for example.

If the forger examines a true security for fluorescence under an ultraviolet lamp, he will discover a broad-band fluorescent emission and will print the genuine or a similar fluorescent substance on his forgery. Under his examination conditions, i.e., with an excitation spectrum up to approximately 400 nm, the forged security will fluoresce like a genuine security. In the case of the authenticity inspection performed in authorized examination instruments, however, the exciting wavelength is restricted to the range less than 300 nm. In this case, only the true security will exhibit fluorescent emission, while the fluorescent substances printed on the security together with binders and pigments will not be adequately excited at this short inspection wavelength due to the high absorption of the binders and pigments. The shorter wavelength of the inspection spectrum compared to the excitation spectrum (curve 2 in FIG. 2) is illustrated by curve 4 in FIG. 2. The special effect of this inspection method is, among other things, to leave the forger completely uninformed as to the actual inspection information.

In another example, the hallmark substance has photoconductive properties. A suitable hallmark substance is zinc sulfide doped with copper as was used in the previous example. The hallmark is inspected by measuring the photoconduction in the area of a ZnS:Cu strip applied to the security. In so doing, a glass plate is pressed down on the security. The glass plate was previously provided on the contact side with two electrodes separated only by a small gap. Using this assembly, the electrical conductivity of the strip can be detected in the dark through the glass plate when the site of measurement is illuminated intensively, thereby determining the photoconduction under the specified examination conditions. The effect can be intensified by arranging the electrodes so that they mesh with one another like combs. The examination procedure described above can, of course, also be combined with examination of the fluorescent emission in accordance with the previous example.

Figure 3:
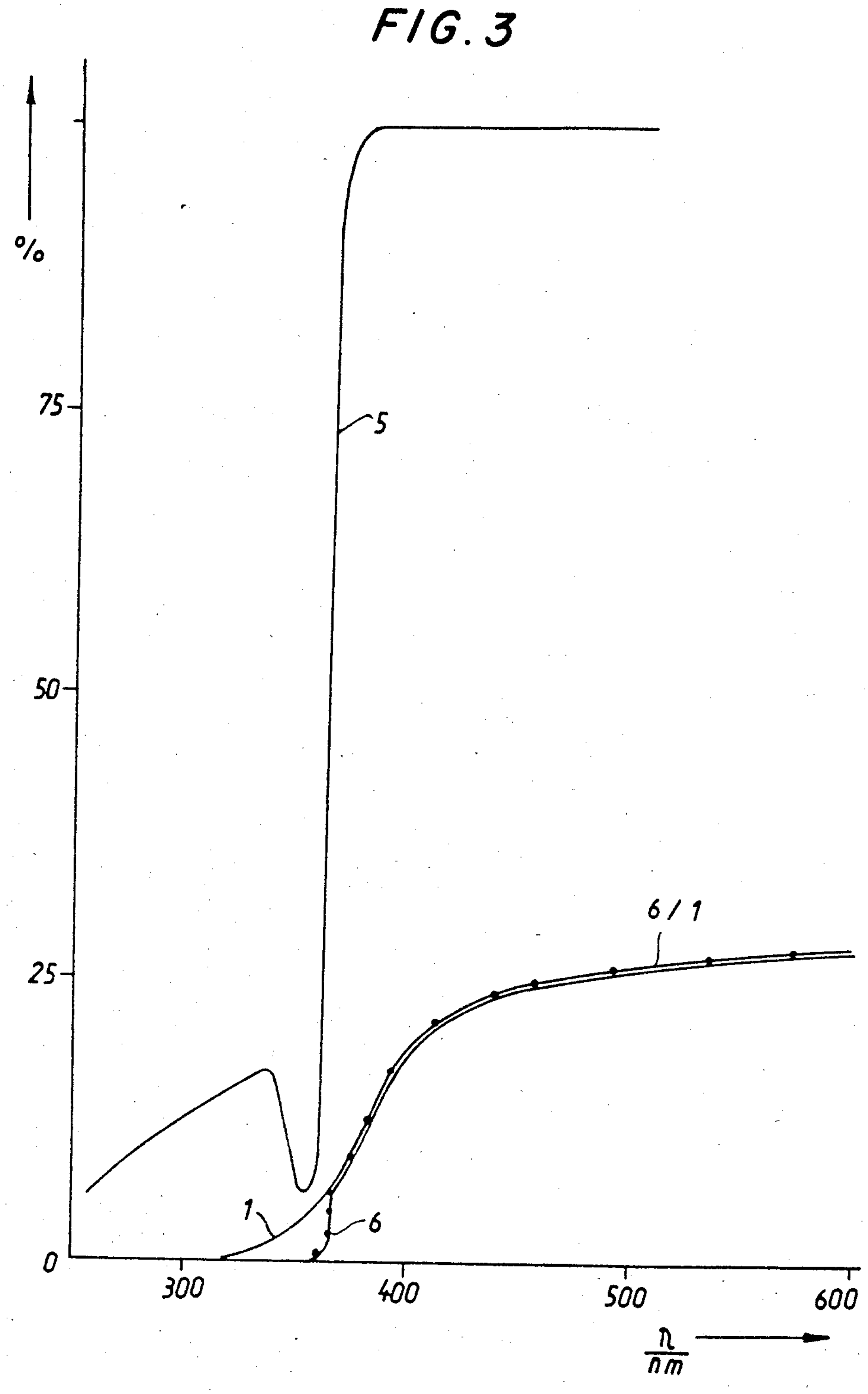
FIG. 3 is similar to FIGS. 1 and 2 and shows optical characteristics of a security paper and a hallmark substance which absorbs ultraviolet light.

Yet another effective examination procedure results when the hallmark substance has ultraviolet-absorbing properties. A suitable substance for this purpose would be zinc oxide (ZnO), for instance. The security used may exclusively contain filler materials such as barium sulfate which are permeable to ultraviolet light in this case. The spectral course of transmission of uncoated bank note paper is shown qualitatively by curve 1 in FIG. 3. Curve 5 represents the transmission of the chosen hallmark substance (literature values). If the applied hallmark layer is not supposed to be visible, the absorption edge must lie in the lower range of transmission of the uncoated bank note paper. The transmission of the coated bank note paper is illustrated by the broken curve 6. FIG. 3 reveals clearly that the transmission of the coated bank note paper adjacent to the absorption edge of the hallmark substance exhibits an irregularity. If the bank note is irradiated with light of a shorter wavelength, it will be practically opaque; if it is irradiated with light of a longer wavelength, it will supply approximately the transmission of the uncoated bank note paper. The printed color of the paper does not change for all practical purposes because the visible frequency spectrum remains substantially the same.

A forgery can be identified by measuring the change in the bank note edge which constitutes an excellent means for detecting and determining the authenticity of the security. The measurement can be performed in the known manner using a commercial remission spectrometer.

Figure 4:
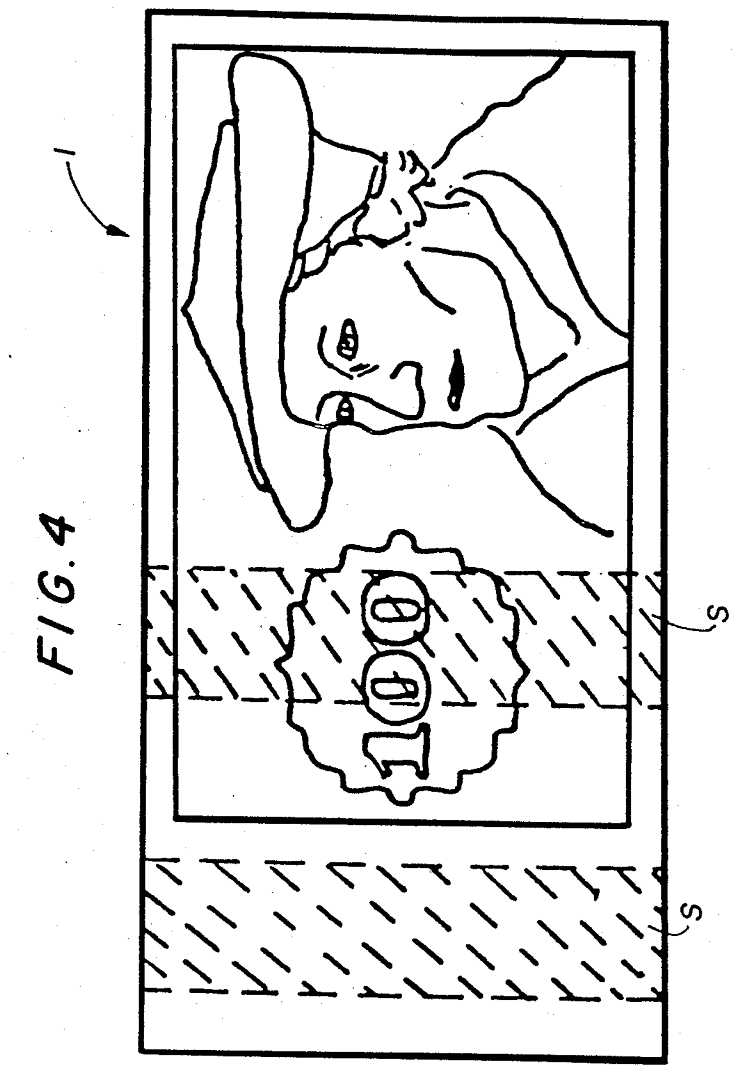
FIG. 4 illustrates a bank note or the like having hallmarks made in accordance with the teachings of this invention.

In a preferred embodiment, the ultravioletabsorbing layer is sputtered onto the security in the shape of strips so that these locations can be compared to the untreated portions of the paper during examination. FIG. 4 schematically represents a bank note or the like 1 having spaced strips S of sputtered hallmark material thereon. The characteristic change in the absorption pattern cannot be obtained by printing, since usual printing techniques do not result in continuous, saturated layers—microscopically speaking—but rather cover only a small portion of the surface to be printed. When irradiated with light which has a shorter wavelength than the critical wavelength of the absorption edge of the hallmark substance, the transmission would thus attain a detectable magnitude in the case of a forgery, whereas it is practically zero in the case of a true security.

The hallmark substance can also be applied in the form of a marginal strip, for example. This is in particular interesting in the case of bank notes when these marginal strips are also to be taken into consideration to determine whether or not the bank note has been torn.

When inspecting the bank note for tears, one side of the bank note is irradiated adjacent to the absorption edge of the uncoated paper with shortwave radiation while the measurement is made on the other side. Due to the absorption behavior of the sputtered layer, the marginal strip will appear dark. Tears, even if they have been overlapped and mended by mechanical pressure, will exhibit a transmission which is higher by a multiple because the intensively absorbing cover layer has been destroyed at these locations.

This hallmark is also immune to forgery methods such as tearing and reprinting for the reasons cited hereinbefore.

Although the most interesting of the new properties which are produced by sputtering even hallmark substances which are already known per se, are of an optical nature, the range of application of this process is in no way restricted to optically effective hallmarks. Advantages also result in the use of nonoptical hallmarks as well, for example, when the hallmark substance is electrically conductive.

Suitable paper is sputtered with stannic oxide ($SnO_2$) analogously to the examples described hereinbefore. The thin, invisible hallmark strips exhibit electrical conductivity which can be examined by means of the known procedures. A suitable device is already described in German Offenlegungsschrift No. 263,699, for example. An optical transmission measurement must also be performed at the measurement site at the same time, however, in order to differentiate the invisibly conducting areas from forgeries in which, for instance, conducting carbon black paints or conducting varnishes based on metal colloids have been applied. The coating exhibits a substantially improved homogenity compared to conductive strips applied to the paper by other deposition procedures. The resultant, clearly improved reproducibility of the conductivity values makes it possible to select narrower measurement tolerances than was hitherto possible.

These examples show that the application of hallmark substances known per se onto security or safety paper by cathode sputtering gives rise to new hallmark properties. These permit a clear and distinct determination of whether a security was sputtered with hallmark substances or whether these substances were applied by different methods. Because sputtering hallmark substances onto securities otherwise necessitates an extraordinarily high expenditure, securities treated in this manner provide a valuable protection against forgery which also lends itself to automatic or machine inspection and examination.

The safety thread and watermark hallmarks, which are important in particular for visual inspection, ultimately derive their unforgeability from the fact that they can be provided only during paper manufacture, that an appropriate paper factory cannot be put into operation inconspicuously and that this would turn out to be more expensive to the forger anyway and would not be compensated for by any possible profits. The beneficial safeguards associated with sputtered hallmarks are comparable. Suitable facilities can be built only in single-piece production by a few conspicuous manufacturing companies. The plants—of which only a very few exist—are expensive, require much know-how and cannot be put into operation and maintained without arousing some attention. Such cathode sputtering plants can only operate economically on the basis of quantities which cannot be achieved with forgeries.

We claim:

1. In a security paper such as a bank note, the combination comprising a single-layer, sheet-like paper substrate; a substantially invisible hallmark in the form of a coating for providing verification of the authenticity of the security paper, said coating being disposed on an outer surface of said security paper in a discontinuous manner whereby coated and uncoated areas are alternately present on such surface; the hallmark coating being formed of a substance having a measurable physical property selected from the group consisting of fluorescence, photoconductivity and UV absorbency; said measurable physical property providing an identifying measurement for such substance; said hallmark coating being applied to said substrate outer surface by a deposition technique such as evaporation or cathode sputtering so as to provide a substance-identifying measurement indicative of said hallmark coating in the pure state free of any measurement-altering adulterant such as binders, overlying films, etc.

2. A security paper according to claim 1, wherein the coating is a member selected from the group consisting of metals, metal compounds and mixtures thereof.

3. A security paper according to claim 1 or 2 wherein the coating is applied by cathode sputtering.

4. A security paper according to one of the claim 1, wherein the hallmark substance is applied in the form of stripes, patterns or figures.

5. A security paper according to one of the claim 1, wherein the coating has fluorescent properties.

6. A security paper according to claim 5, wherein the fluorescent emission of the coating can be excited by light with wavelength less than 400 nm, preferably less than 300 nm.

7. A security paper according to one of the claim 1, wherein the coating has photoconductive properties.

8. A security according to claim 7, wherein the coating consists of zinc sulfide doped with copper.

9. A security paper according to claim 5, wherein the coating consists of yttrium oxide doped with europium.

10. A security paper according to claim 1, wherein the coating has ultraviolet-absorbing properties.

11. A security paper according to claim 10, wherein the coating and the paper substrate are matched in such a way that the absorption edge of the coating is still in the transmission range of the paper substrate.

12. A security paper according to claim 11, wherein the coating consists of zinc oxide.

13. A security paper according to claim 1, wherein the coating has electrically conducting properties.

14. A security paper according to claim 13, wherein the coating consists of stannic oxide.

15. In a security paper such as a bank note, the combination comprising single-layer, sheet-like paper substrate; a hallmark in the form of a coating for providing verification of the authenticity of the security paper; said coating being disposed on an outer surface of said security paper in a discontinuous manner whereby coated and uncoated areas are alternately present on such surface; the hallmark coating being formed of a substance having electrically conducting properties providing an identifying measurement for such substance; said hallmark coating being applied to said substrate outer surface by a deposition technique such as evaporation or cathode sputtering so as to provide a substance-identifying measurement indicative of said hallmark coating in the pure state free of any measurement-altering adulterant such as binders, overlying film, etc.

16. A security paper according to claim 15, wherein the coating is substantially invisible to the naked eye.

17. In a security paper such as a bank note, the combination comprising a single-layer, sheet-like paper substrate; a hallmark in the form of a coating for providing verification of the authenticity of the security paper, said coating being disposed on an outer surface of said security paper in a discontinuous manner whereby coated and uncoated areas are alternately present on such surface; the hallmark coating being formed of a substance having a measurable physical property providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying films, etc.

18. In a security paper such as a bank note, the combination comprising a single-layer, sheet-like paper substrate; a hallmark in the form of a coating for providing verification of the authenticity of the security paper; said coating being disposed on an outer surface of said security paper in a discontinuous manner whereby coated and uncoated areas are alternately present on such surface; the hallmark coating being formed of a fluorescing substance which emits light in a certain spectral range when exposed to light of a different spectral range; the fluorescence of said substance providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying films, etc.

19. In a security paper such as a bank note, the combination comprising a single-layer, sheet-like paper substrate; a hallmark in the form of a coating for providing verification of the authenticity of the security paper; said coating being disposed on an outer surface of said security paper in a discontinuous manner whereby coated and uncoated areas are alternately present on such surface; the hallmark coating being formed of a photoconducting substance, having a measurable electrically conductive property when exposed to light of a certain spectral range; said electrically conductive property providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying films, etc.

20. In a security paper such as a bank note, the combination comprising a single-layer, sheet-like paper substrate; a hallmark in the form of a coating for providing verification of the authenticity of the security paper, said coating being disposed on an outer surface of said security paper in a discontinuous manner whereby coated and uncoated areas are alternately present on such surface; the hallmark coating being formed of a substance which has an absorption spectrum in the UV-spectral range differing from that of said security paper; the absorption spectrum of said substance providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying films, etc.

21. In a security paper such as a bank note, the combination comprising single-layer, sheet-like paper substrate; a hallmark in the form of a coating for providing verification of the authenticity of the security paper; said coating being disposed on an outer surface of said security paper in a discontinuous manner whereby coated and uncoated areas are alternately present on such surface; the hallmark coating being formed of a substance having electrically conducting properties and providing conductivity values ranging between predetermined upper and lower limits for providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying film, etc.

22. In a security paper such as a bank note, the combination comprising a single-layer, sheet-like paper substrate; a substantially invisible hallmark in the form of a coating for providing verification of the authenticity of the security paper; said coating being disposed on an outer surface of said security paper in a discontinuous manner whereby coated and uncoated areas are alternatively present on such surface; the hallmark coating being formed of a substance having a measurable physical property providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying films, etc.

23. In a security paper such as a bank note, the combination comprising a single-layer, sheet-like paper substrate; a substantially invisible hallmark in the form of a coating for providing verification of the authenticity of the security paper; said coating being disposed on an outer surface of said security paper in a discontinuous manner whereby coated and uncoated areas are alternately present on such surface; the hallmark coating being formed of a fluorescing substance which emits light in a certain spectral range when exposed to light of a different spectral range; the fluorescense of said substance providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying films, etc.

24. In a security paper such as a bank note, the combination comprising a single-layer, sheet-like paper substrate; a substantially invisible hallmark in the form of a coating for providing verification of the authenticity of the security paper; said coating being disposed on an outer surface of said security paper in a discontinuous manner whereby coated and uncoated areas are alternately present on such surface; the hallmark coating being formed of a photoconducting substance, having a measurable electrically conductive property when exposed to light of a certain spectral range; said electrically conductive property providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying films, etc.

25. In a security paper such as a bank note, the combination comprising a single-layer, sheet-like paper substrate; a substantially invisible hallmark in the form of a coating for providing verification of the authenticity of the security paper, said coating being disposed on an outer surface of said security paper in a discontinuous manner whereby coated and uncoated areas are alternately present on such surface; the hallmark coating being formed of a substance which has an absorption spectrum in the UV-spectral range differing from that of said security paper; the absorption spectrum of said substance providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying films, etc.

26. In a security paper such as a bank note, the combination comprising single-layer, sheet-like paper substrate; a substantially invisible hallmark in the form of a coating for providing verification of the authenticity of the security paper; said coating being disposed on an outer surface of said security paper in a discontinuous manner whereby coated and uncoated areas are alternately present on such surface; the hallmark coating being formed of a substance having electrically conducting properties and providing conductivity values ranging between predetermined upper and lower limits for providing an identifying measurement for such substance; said hallmark coating being applied to said substrate outer surface by cathode sputtering so as to provide a substance-identifying measurement indicative of said hallmark coating in the pure state free of any measurement-altering adulterant such as binders, overlying film, etc.

27. A security paper according to one of the claims 17, 18, 19, 20, 21, 22, 23, 24, 25 or 26, wherein the hallmark substance is applied in the form of stripes, patterns or figures.

28. A security paper according to one of the claims 18 or 26, wherein the fluorescent emission of the coating can be excited by light with wavelength less than 400 nm, preferably less than 300 nm.

29. A security paper according to one of the claims 18 or 26 wherein the coating consists of yttrium oxide doped with europium.

30. A security paper according to one of the claims 18, 19, 23 or 24, wherein the coating consists of zinc sulfide doped with copper.

31. A security paper according to one of the claims 20 or 25, wherein the coating and the paper substrate are matched in such a way that the absorption edge of the coating is still in the transmission range of the paper substrate.

32. A security paper according to claim 31, wherein the coating consists of zinc oxide.

33. A security paper according to one of the claims 21 or 26, wherein the coating is a member selected from the group consisting of metals, metal compounds and mixtures thereof.

* * * * *

UNITED STATES PATENT AND TRADEMARK OFFICE
CERTIFICATE OF CORRECTION

PATENT NO. : 4,591,707

DATED : May 27, 1986

INVENTOR(S) : Gerhard Stenzel et al.

It is certified that error appears in the above-identified patent and that said Letters Patent is hereby corrected as shown below:

ON THE TITLE PAGE:

In [63] (Related U.S. Application Data) change "82,255 Oct. 5, 1979, Pat. 4289978" to --082,266, Oct. 5, 1979 abandoned.--
In [73] change assignee name portion "Gao to --GAO--.

Abstract l. 8, "spcetrum" should be --spectrum--
Col. 1, delete lines 7-8, and substitute --082,266, filed Oct. 5, 1979, now abandoned.--
Col. 1, l. 18, "unathorized" to --unauthorized--
Col. 1, l. 57, "pup" should be --pulp--
Col. 2, l. 20, after "or" insert --optical properties. Fluorescent substances are mentioned in--
Col. 2, l. 31, "quantitively" should be --quantitatively--
Col. 3, l. 2, "hall mark" should be --hallmark--
Col. 3, l. 8, "behavoir" should be --behavior--
Col. 3, l. 32-33, "ahesion" should be --adhesion--
Col. 7, l. 37, "ultravioletabsorbing" should be --ultraviolet-abosrbing--
Col. 8, l. 24, "homogenity" should be --homogeneity--
Col. 9, l. 16, (Claim 4), omit "one of the"
Col. 9, l. 19, (claim 5), omit "one of the"
Col. 9, l. 25, (Claim 7), omit "one of the"
Col. 9, l. 27, (Claim 8), after "security", insert --paper--
Col. 10, l. 63, Claim 21), after "comprising", insert --a--

UNITED STATES PATENT AND TRADEMARK OFFICE

CERTIFICATE OF CORRECTION

PATENT NO. : 4,591,707

DATED : May 27, 1986

INVENTOR(S) : Gerhard Stenzel et al.

It is certified that error appears in the above-identified patent and that said Letters Patent is hereby corrected as shown below:

Col. 11, ll. 17-18, (Claim 22), change "alternatively" to--alternately--
Col. 12, l. 42, (Claim 28), change "26" to --23--
Col. 12, l. 46, (Claim 29), change "26" to --23--

Signed and Sealed this

Sixteenth Day of August, 1988

*Attest:*

DONALD J. QUIGG

*Attesting Officer*

*Commissioner of Patents and Trademarks*